(12) United States Patent
Monkiewicz et al.

(10) Patent No.: US 9,916,586 B2
(45) Date of Patent: Mar. 13, 2018

(54) CLIENT-SIDE DEPOSIT PACKAGING COMPLIANCE

(71) Applicant: Bank of America Corporation, Charlotte, NC (US)

(72) Inventors: Shelaine M. Monkiewicz, Marietta, GA (US); Thomas A. Harp, Cincinnati, OH (US); James Pierce, Charlotte, NC (US); Lisa Gibson, Newnan, GA (US); Rebecca S. Morgan, Charlottesville, VA (US)

(73) Assignee: Bank of America Corporation, Charlotte, NC (US)

( * ) Notice: Subject to any disclaimer, the term of this patent is extended or adjusted under 35 U.S.C. 154(b) by 88 days.

(21) Appl. No.: 14/108,491

(22) Filed: Dec. 17, 2013

(65) Prior Publication Data

US 2015/0170158 A1 Jun. 18, 2015

(51) Int. Cl.
*G06Q 30/00* (2012.01)
*G06Q 40/02* (2012.01)

(52) U.S. Cl.
CPC ......... *G06Q 30/018* (2013.01); *G06Q 40/02* (2013.01)

(58) Field of Classification Search
CPC ...... G06Q 20/108; G06Q 20/10; G06Q 20/30; G06Q 40/02; G06F 15/00; G06F 17/00; G06F 17/60; G06F 17/21
See application file for complete search history.

(56) References Cited

U.S. PATENT DOCUMENTS 5,359,667 A * 10/1994 Borowski ............ G06K 9/2054
382/138
6,604,086 B1 * 8/2003 Kolls .................... G06Q 10/10
705/14.23
2001/0051921 A1 * 12/2001 Garner, IV ........ G06F 17/30011
705/42
2013/0140358 A1 * 6/2013 Graef .................... G06Q 40/02
235/379
2014/0330718 A1 * 11/2014 Felse .................. G06Q 20/1085
705/42

OTHER PUBLICATIONS

Hogle, W. R. (1962). Accounting, Inventory, and Stock Control Applications of Data Processing Equipment in School Business Management (Order No. 6206063). Available from ProQuest Dissertations & Theses Global. (302122057). Retrieved from https://search.proquest.com/docview/302122057?accountid=14753.*

* cited by examiner

*Primary Examiner* — Muriel S Tinkler (74) *Attorney, Agent, or Firm* — Weiss & Arons LLP; Michael A. Springs, Esq.

(57) ABSTRACT

Apparatus and methods for client-side deposit packaging compliance are provided. Apparatus and methods may include deploying a uniform reporting format for clients, banks, armored couriers and vaults. The uniform reporting format may be a XML data feed. The XML data feed may provide for reporting of condition codes associated with a deposit. The condition codes may correspond to one or more attributes of a deposit packaged by a client. The condition codes may be submitted by the client. The condition codes may be verified when a deposit is processed by a vault. Illustrative condition codes may correspond to: armored courier ID, envelope status, counterfeit status. The XML data feed may utilize dynamic online, rule-based forms for clients, banks, armored couriers and vaults.

18 Claims, 6 Drawing Sheets

Client Deposit Report 500

| Deposit ID No. 501 | Deposit Amount 503 | Envelope Status 505 | Armored Courier ID 507 | Condition Codes 509 |
|---|---|---|---|---|
| 1 | $1,258.75 | X | Armored Service A | 1, 5, 7, 9 |
| 2 | $5,000.00 | √ | Armored Service C | 1, 3, 9, 11 |
| 3 | $3,475.25 | X | Armored Service B | 1, 3, 5, 7 |
| 4 | $10,005.10 | X | Armored Service C | 3, 5, 7 |
| 5 | $7,150.00 | √ | Armored Service A | 1, 3, 5, 9, 11 |

FIG. 5

Condition Code Table 600

| 1 | No staples |
|---|---|
| 2 | Yes staples |
| 3 | No rubberbands |
| 4 | Yes rubberbands |
| 5 | No paperclips |
| 6 | Yes paperclips |
| 7 | No excessive coins |
| 8 | Yes excessive coins |
| 9 | Cash only |
| 10 | Mixed deposit |
| 11 | No courier error |
| 12 | Yes courier error |

FIG. 6

Deposit Report

| Deposit ID No. | Deposit Amount | Customer Side Condition Codes | Courier | Vault Side Condition Codes | Flag |
|---|---|---|---|---|---|
| 1 | $1,258.75 | 1, 5, 7, 9 | Armored Service A | 1, 5, 7, 9 | |
| 2 | $5,000.00 | 1, 3, 9, 11 | Armored Service C | 1, 4, 9, 11 | √ |
| 3 | $3,475.25 | 1, 3, 5, 7 | Armored Service B | 1, 3, 6, 8 | √ |
| 4 | $10,005.10 | 3, 5, 7, 11 | Armored Service C | 3, 5, 8, 12 | √ |
| 5 | $7,150.00 | 1, 3, 5, 9, 11 | Armored Service A | 1, 3, 5, 9, 11 | |

FIG. 7

Invoice

| Deposit ID No. | Deposit Amount | Condition Code Error | Courier | Cost |
|---|---|---|---|---|
| 2 | $5,000.00 | 3, 4 | Armored Service C | $10.00 |
| 3 | $3,475.25 | 5, 6 / 7, 8 | Armored Service B | $25.00 |
| 4 | $10,005.10 | 7, 8 / 11, 12 | Armored Service C | $5.00 |

CLIENT-SIDE DEPOSIT PACKAGING COMPLIANCE

FIELD OF TECHNOLOGY

Aspects of the invention related to technology for managing and improving compliance with deposit packaging rules.

BACKGROUND

A client of a financial institution may receive depositable items from customers. The client may be a provider of goods and/or services. The client may receive the depositable items in exchange for providing goods and/or services to customers. Exemplary depositable items may include cash, check and credit card payments. The client may wish to transfer a value of the depositable items to an account held at a financial institution. The client may wish to obtain a credit for a value of the deposit as soon as possible.

To obtain the credit the client may package the depositable items received from its customers. The packaged depositable items may be a deposit. After packaging the deposit, the client may submit a report to the financial institution. The report may include information related to contents of a deposit. The report may include information relating to a method deployed by the client to transport the deposit. The report may include any suitable financial information requested by the financial institution.

The client may prepare the report in a first format. The financial institution may need to convert or otherwise process the client report in the first format. For example, computer systems at the financial institution may store the information included in the client report in a second format. The financial institution may convert the client report from the first format into the second format. Processing reports received in a non-uniform formats may be associated with costs such as computational overhead, informational errors and/or time delay in processing a deposit.

The client may package the deposit and summon an armored courier service to transport the deposit. The client may utilize a plurality of different armored courier services to transport deposits. For example, the client may be a retail merchant that operated a plurality of stores in different geographic regions. Each geographic region may be serviced by a different armored courier service. Even within a single geographic region, the client may utilize a plurality of armored courier services.

An armored courier service may submit a report to the client, financial institution and/or vault. For example, an armored courier may transmit verification to a financial institution that a deposit has been retrieved from a client. An armored courier may update a vault and/or financial institution on a current location of a deposit retrieved from the client. The armored courier may generate its report in a third format. Each armored courier may generate reports in a proprietary format.

The financial institution, client and/or vault may process the report received from an armored courier. For example, computer systems at the vault may operate more efficiently when information is input into the system in a fourth format. The vault may convert reports received from an armored courier from the third format into the second format. Processing reports received in a non-uniform formats may be associated with costs such as computational overhead, informational errors and/or time delay in processing a deposit.

The armored courier may transport the deposit packaged by a client to a vault. The vault may process the deposit on behalf of the client and/or financial institution. The vault may be operated by the financial institution or may be contracted by the financial institution to provide deposit processing services. Deposit processing services may include verifying contents of a deposit packaged by a client. Before crediting the client for a value of the payments, the financial institution may require verification of the depositable items included in a deposit.

Each armored courier, financial institution and/or client may interact with a plurality of vaults. Each entity that interacts with a deposit may generate reports in a proprietary format. For example, computer systems at the client, armored courier and/or financial institution may operate more efficiently when information is input into the system in a proprietary format used by each respective entity. Processing reports received in a non-uniform formats may be associated with costs such as computational overhead, informational errors and/or time delay in processing a deposit.

To process a deposit, a vault may count each depositable item packaged by a client. The vault may examine each depositable item packaged by a client. The vault may perform other suitable processing tasks. The client may package the deposit in a manner that slows the processing performed by the vault. For example, the client may package depositable items using rubber bands and/or paperclips. To process the deposit, the vault may need to remove the rubber bands and/or paperclips. Slow processing of a deposit by the vault may delay a crediting of a value of the deposit to the client.

It would be desirable to reduce delays associated with vault processing of a deposit packaged by a client. It would be desirable reduce delays associated with crediting a value of a deposit to a client. It would be desirable to improve customer compliance with rules for packaging deposits.

It would be desirable to provide a harmonized reporting format that may be utilized by clients, financial institutions, armored couriers and/or vaults. It would be desirable to leverage a uniform reporting format to decrease delay associated with a crediting to a client of a value of a deposit packaged by the client. It would be desirable therefore to provide apparatus and methods for client-side deposit packaging compliance.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and method for improving client-side deposit packaging compliance are provided. The apparatus may include a computer system. The computer system may include a processor and a non-transitory computer readable media. The non-transitory computer readable media may store computer executable instructions that when executed by the processor configure the computer system to perform one or more tasks. The tasks may be steps in a method for improving client-side deposit packaging compliance.

The instructions may configure the computer system to receive a client deposit report. The client deposit report may be generated by a client of a bank. The client may hold one or more accounts at the bank. The client deposit report may include a condition code. The condition code may correspond to an attribute of a deposit packaged by the client.

For example, the client may be a retail merchant. The retail merchant may receive checks and cash in exchange for items sold or services provided. The checks and cash may be packaged into a deposit at the retail location. The attribute of the deposit may be a weight of the deposit. The attribute of the deposit may be a manner of packing the deposit. The attribute may be any suitable attribute.

The bank may request that the retail merchant comply with instructions for packaging the deposit. The instructions may include requesting that the retail merchant package the deposit in a specific manner. For example, the bank may require that the merchant package the deposit is a manner that allows for expeditious processing of the deposit by the bank or a vault. The bank may request that the deposit be packaged without paper clips, rubber bands or staples. The attribute may correspond to an affirmation by the retail merchant that the deposit has been package in the manner requested by the bank.

In response to transmitting an affirmation that the deposit has been packaged in the manner requested by the bank, the retail customer may receive expeditious processing of the deposit. In response to transmitting the affirmation, the retail customer may be charged for processing the deposit according to a special fee schedule. By transmitting the affirmation the retail customer may avoid a fee charged for removing paper clips, staples, rubber-bands or other unwanted items included in the deposit.

The computer system may prompt the client to enter a condition code by selecting the condition code from among a plurality of condition codes. The plurality of condition codes may correspond to unwanted items that may be used to package a deposit. The plurality of condition codes may correspond to any suitable attributes of the deposit.

The client deposit report may include a set of condition codes. Each member of the set of condition codes may, correspond to verification and/or affirmation of an attribute of the deposit packaged by the client. For example, a condition code may correspond to an affirmation by the client that the deposit is free of a specific unwanted item.

The members of the set of condition codes may be displayed to the client. Each member of the set of condition codes may be displayed to the client alongside a fee charged to process a deposit that does not have the attribute selected by the client. Illustrative attributes of a deposit are shown below in Table 1.

TABLE 1

Illustrative deposit attributes
Deposit Attributes

No Paper Clips
No Rubber Bands
No Staples
Excess Coins
No Non-Currency Items (I.E., Paper Dividers)
Single Denomination
Cash Only
Envelope Status
Counterfeit Status
Armored Courier Id
Vault ID For example, the condition code may correspond to an affirmation, by the client to the bank, that the deposit packaged by the client does not include a specific unwanted item. By including the condition code in the client deposit report, the client is verifying that the deposit packaged by the client is free of the specific unwanted item. If the deposit is processed by the vault and found to include the unwanted item, the client may be charged a fee corresponding to the attribute.

A deposit packaged by the client may be retrieved from a retail location by an armored courier service. The client deposit report may include an identifier corresponding to an armored courier assigned to retrieve the deposit packaged by the client from a location of the client. The client deposit report may include an envelope status of the deposit packaged by the client. The client deposit report may include a counterfeit status of currency included in the deposit packaged by the client. The client deposit report may include an attribute of the deposit determined at a location of the client.

The armored courier service may transfer the deposit to a vault. The deposit may be processed at the vault. The vault may be operated by the bank. The vault may be operated by the armored courier service. The vault may be operated by any suitable party. The client deposit report may include an attribute of the deposit that may be verified when the deposit is processed at the vault. Illustrative processing tasks that may be performed at the vault are shown below in Table 2.

TABLE 2

Illustrative vault processing tasks
Vault Processing Tasks

Examine Deposit/Identify Presence Of Unwanted Items Included In Deposit
Remove Non-Depositable Items
Determine Compliance With Packaging Instructions
Count Cash
Sort Cash/Checks
Check For Counterfeit Cash
Scan Checks
Submit Electronic Copies Of Checks To Payor Bank For Payment
Weigh Deposit/Cash
Repackage Cash For Transfer To Other Locations The computer system may be configured to receive a vault report. The vault report may be generated based on a processing of the deposit at the vault. The vault report may include a condition code corresponding to the attribute of the deposit submitted by the client. For example, the client may generate a deposit report that includes a first condition code. The first condition code may correspond to an affirmation made by a client that the deposit does not include paper clips. At the vault, the deposit may be processed. The processing of the deposit may include verifying that the deposit does not include any paper clips.

If the deposit does not include paper clips, the vault may generate a report that confirms the first condition code submitted by the client. If the deposit does include paper clips, the vault may generate a report that includes a second condition code. The second condition code may indicate that the deposit did include paper clips. A fee may be charged for processing a deposit that includes an unwanted item such as paperclips. The fee may be based, at least in part, on a difference between the first condition code and the second condition code.

The computer system may display a prompt to enter the second condition code. The second condition code may be selected from among a plurality of condition codes. Each of the plurality of condition codes may correspond to an unwanted item may have been used by the client to package the deposit. The plurality of condition codes may correspond to any suitable attribute of a deposit.

The computer system may be configured to generate a deposit record. The deposit record may be generated based on information in the client deposit report. The deposit record may be generated based on information in the vault report. The deposit record may be generated based on information in a report submitted by an armored courier. The deposit record may include a first condition code submitted by the client. The deposit record may include a second condition code submitted by a vault. The deposit record may include a third condition code submitted by an armored courier. A deposit report may include a plurality of deposit records.

The computer system may be configured to compare two or more condition codes included in the deposit record. For example, the computer system may compare the first condition code to the second condition code. If the first condition code is different from the second condition code, the computer system may append a flag to the deposit record. The flag may be associated with a processing cost. The cost may correspond to a fee for processing a deposit that includes an undesirable attribute.

For example, a deposit may include unwanted items packaged with the deposit. The computer system may be configured to transmit the processing cost to the client. The processing cost may be transmitted to the client along with a copy of a client deposit report, vault report, armored courier report and/or deposit report.

A client deposit report may be transmitted to the bank. The client deposit report may be transmitted from the client. A bank may advocate a uniform reporting format. For example, the bank may advocate reporting using an XML data feed.

A client deposit report may be transmitted to the bank as an XML data feed. The XML data feed may identify fields in the client report. Identification of fields in the client report may allow information included in the report to be efficiently processed by the bank, vault, armored courier or other suitable entities that may receive the client deposit report. Identification of fields in the client report may allow information to be efficiently parsed from a report.

The bank may receive the vault deposit report as an XML data feed. The bank may streamline processing of reports by receiving the reports in XML format. The XML format may standardize information received by the bank from a plurality of clients, a plurality of armored couriers and/or a plurality of vaults. Streamlining reports may result in more efficient processing of deposits packaged by a client. Streamlining reports may allow the bank to identify and reduce defects in client-side deposit packaging. Streamlining reports may allow the bank to reduce delays in crediting a value of a deposit to a client.

Apparatus may include a computer system configured to receive a first client report. The computer system may be operated by a bank. The first client report may include a first set of condition codes. The first set of condition codes may correspond to attributes of a first deposit packaged by the client.

In response to receiving the first client report, the computer system may initiate a transfer of the first deposit to a vault. The initiating may include requesting that an armored courier retrieve the deposit from the client. The first deposit may be processed at the vault. Illustrative processing tasks that may be performed at the vault are shown above in Table 2.

The computer system may be configured to receive a vault report. The vault report may include a second set of condition codes. The second set of condition codes may correspond to attributes of the first deposit determined at the vault. For example, the client deposit report may include a condition code corresponding to an affirmation, made by the client, that the deposit does not include any rubber bands. When the deposit packaged is processed by the vault, the vault may determine that the deposit does include rubber bands.

A presence of rubber bands may slow processing tasks performed by the vault. The presence of rubber bands may delay a crediting of a value of the deposit to the client. The vault may indicate the presence of the rubber bands in a second set of condition codes submitted to the bank in the vault report. The second set of condition codes may include any suitable attribute of a deposit. Illustrative attributes of a deposit are shown above in Table 1.

The computer system may identify a difference between the second set of condition codes submitted by the vault and the first set of condition codes submitted by the client. If the computer system detects a difference between the first set of condition codes and the second set of condition codes, the computer system may remind the client to follow the bank's instructions for packaging deposits.

The computer system may generate a template for a second client report based on a difference between the second set of condition codes and the first set of condition codes. For example, if the difference indicates that the client has not followed deposit packaging promulgated by the bank, the template may include a display of processing fees that may be imposed for non-compliance with the instructions.

The template may include a reminder displayed to client after a condition code is selected. For example, if the client selects a condition code that corresponds to an affirmation that the deposit includes a single denomination of currency, the template may display a notice reminding the client that a previously packaged deposit associated with the selected condition code included two or more denominations.

The computer system may be configured to calculate a compliance score of a first deposit associated with a first set of condition codes. The first set of condition codes may be submitted by a client. The compliance score may be based on a difference between a second set of condition codes and the first set of condition codes submitted by the client. The second set of condition codes may be submitted by a vault.

For example, a first set of condition codes may include an affirmation that a deposit does not include an excessive number of coins. Any number of coins may be an excessive number. When the deposit is received by the vault, the vault may evaluate whether the client has complied with the first condition codes included in a client deposit report. The vault may submit a second set of condition codes based on the evaluation of customer compliance with the first set of condition codes.

Based on an evaluation by a vault of a deposit packaged by a client, a vault deposit report may be generated. A compliance score may be determined based on difference between condition codes reported by the client and condition codes reported by the vault. The computer system may generate an invoice for vault services based on the compliance score. The invoice may be generated based on a past history of a client's compliance with deposit packaging instructions promulgated by a bank and/or vault.

After determining the compliance score, a template for another client deposit report may be generated based on the compliance score. For example, if the compliance score is below a threshold score, the computer system to display to the client a potential invoice for vault services generated based on the previous compliance score. The computer system may display to the client tasks for packaging the second deposit to avoid payment of a fee included in the invoice.

Methods for managing customer compliance with a packaging of a deposit are provided. One or more computer-readable media may store computer-executable instructions that when executed by a processor on a computer system, perform the methods.

The methods may include receiving a compliance report from a client. The compliance report may attest to the client's compliance with instructions for packaging a deposit. The compliance report may include one or more condition codes. The methods may include extracting a first set of condition codes from the compliance report.

The first set of conditions codes may correspond to an affirmation made by the client that the deposit does not include more than a threshold amount of paper clips, staples, rubber bands and/or any suitable instructions received from the bank.

The methods may include receiving a vault report from a vault service provider. The vault service provider may process a deposit packaged by the client. The methods may include extracting a second set of condition codes from the vault report. The second set of condition codes may correspond to an evaluation, by the vault service provider, of the first set of condition codes submitted by the client.

The methods may include comparing the first set of condition codes to the second set of condition codes. If the first set of condition codes is identical to the second set of condition codes, the methods may include transmitting a first invoice to the client. If the first set condition codes is different from the second set of condition codes, the methods may include transmitting a second invoice to the client. The second invoice may include a larger amount due than the first invoice.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
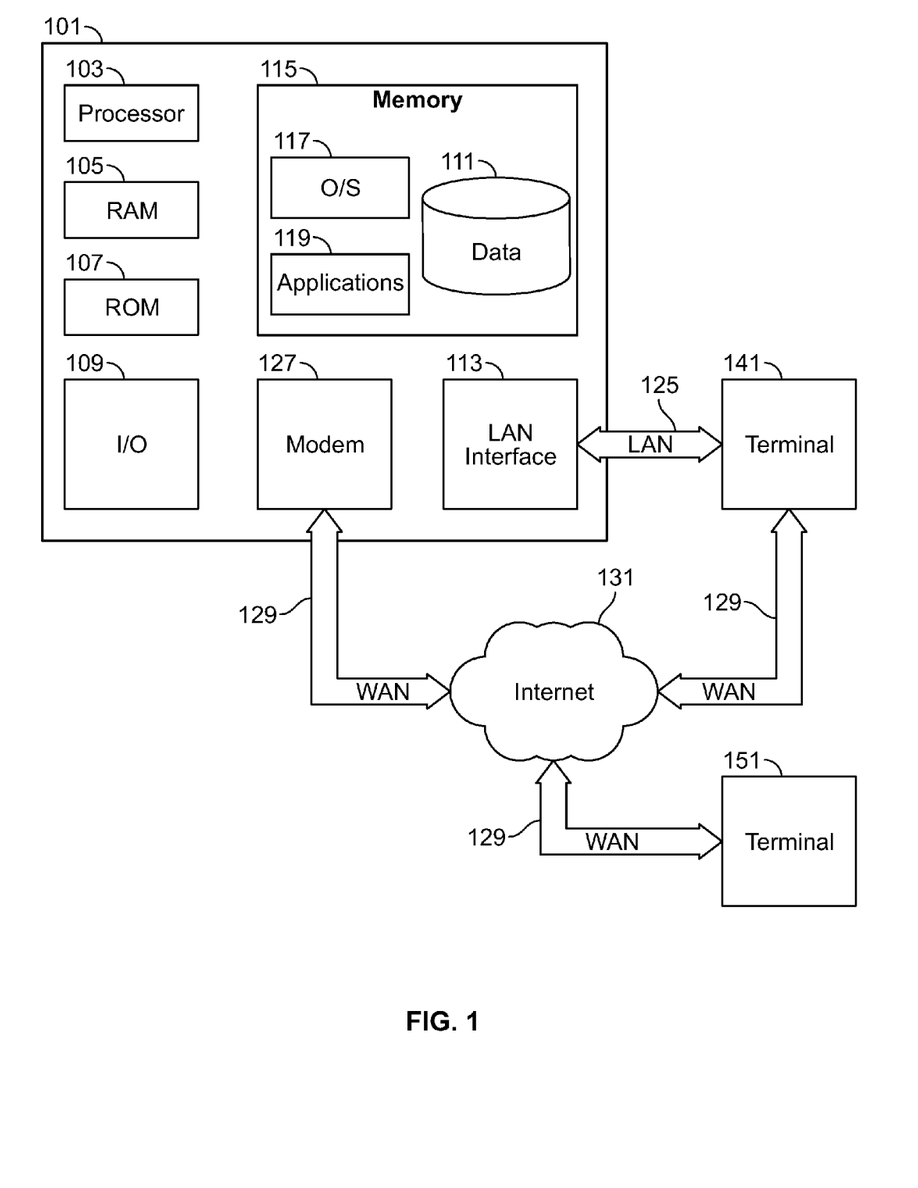
FIG. 1 shows an illustrative apparatus in accordance with principles of the invention.

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. I/O module 109 may include any suitable transmitter including hardware. I/O module 109 may include any suitable receiver including hardware.

Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to receive reports, transmit reports, calculate compliance scores, calculate invoices, compare sets of condition codes and/or any other suitable tasks.

Figure 2:
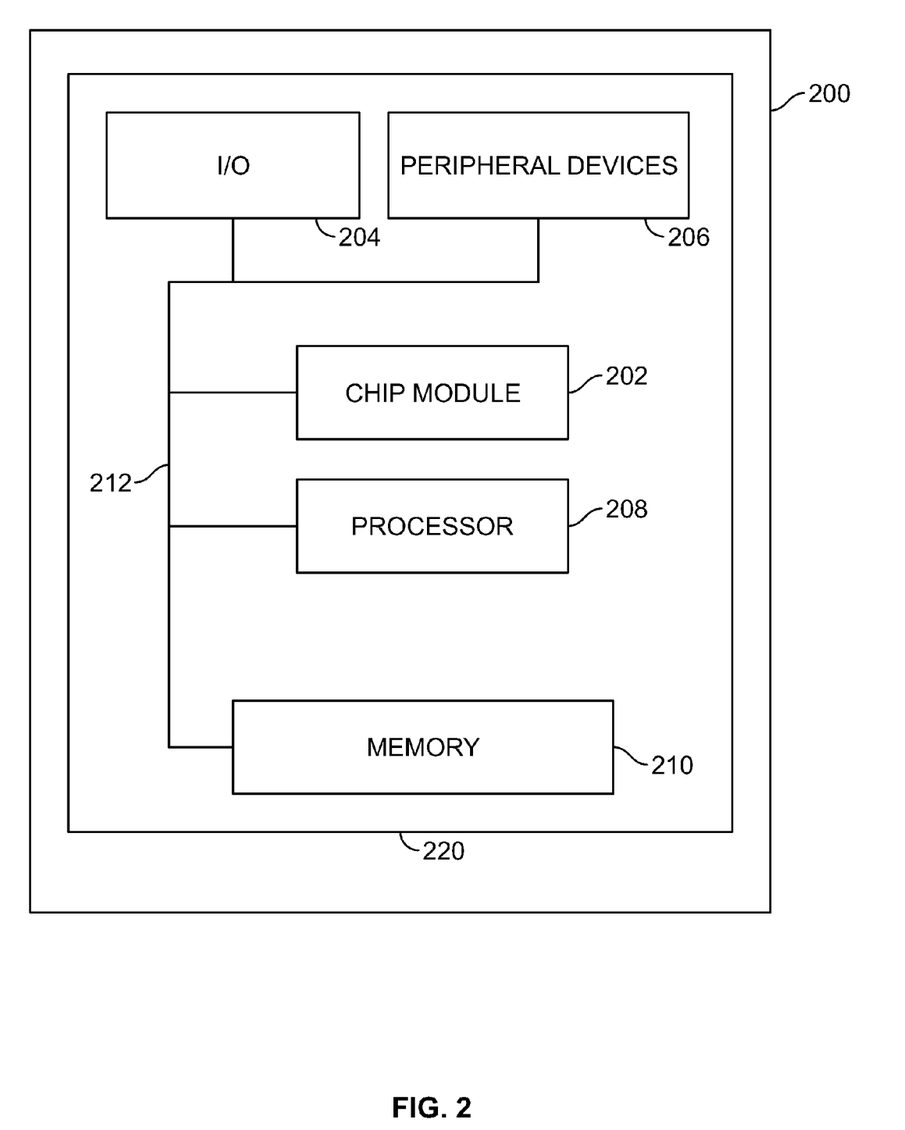
FIG. 2 shows an illustrative apparatus in accordance with principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: client deposit reports, vault reports, armored courier reports, deposit records and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
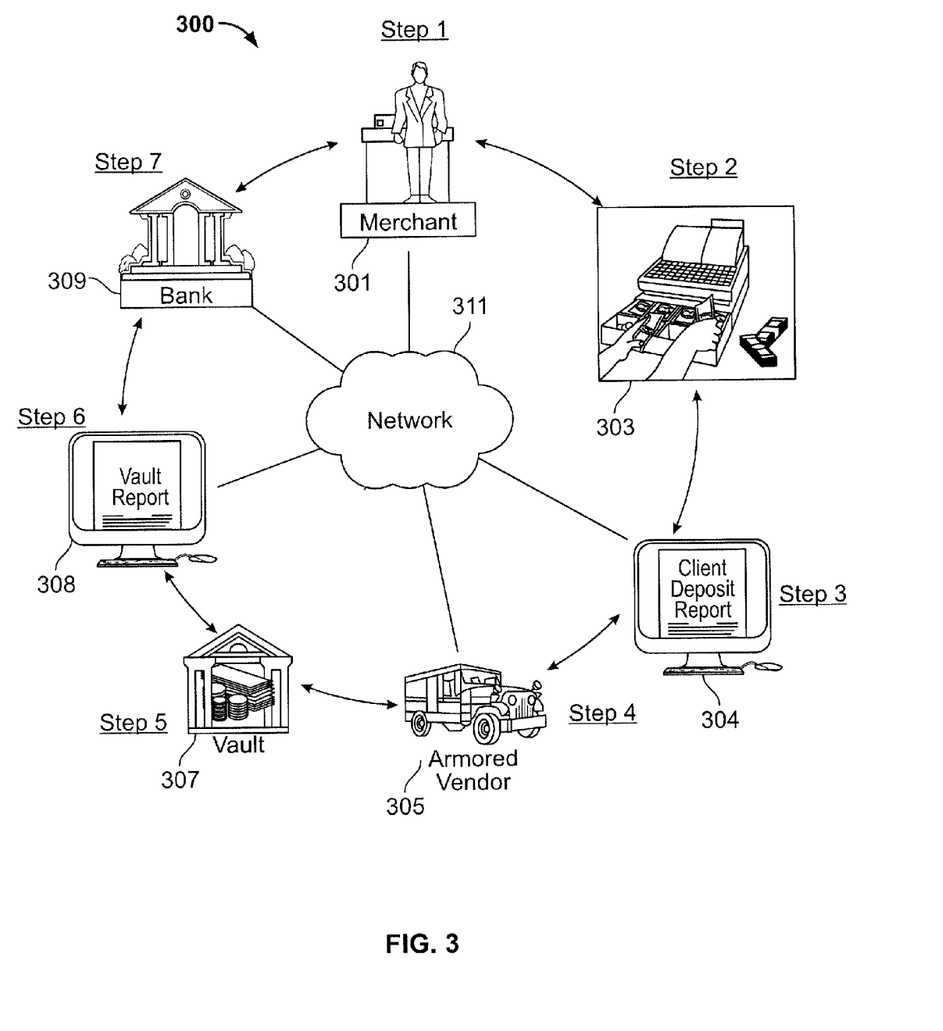
FIG. 3 shows an illustrative arrangement in accordance with principles of the invention.

FIG. 3 shows illustrative flow 300. Flow 300 begins at step 1. At step 1, merchant 301 receives depositable items in exchange for merchandise and/or services. At step 2, the depositable items are sorted and packaged. The depositable items may be packaged and sorted using cash handling device 303. At step 3, the merchant 301 submits client deposit report 304. Client deposit report 304 may include a set of condition codes corresponding to a deposit packaged by the merchant. Client deposit report 304 may attest to compliance with packaging instructions provided by bank 309. Client deposit report 304 may be transmitted to the bank via network 311.

At step 4, armored courier service 305 retrieves the deposit by merchant 301. Armored courier service 305 transports the packaged deposit to vault 307. At step 5, the packaged deposit is unpacked at vault 307. Vault 307 may examine contents of a deposit packaged by merchant 301, and verify the set of condition codes or other informational items included in the client deposit report submitted by merchant 301.

At step 6, vault 307 prepares and submits vault report 308 to bank 309. Vault report 308 includes an assessment by the vault of the client's compliance with affirmations included in the client deposit report. Vault report 308 may be submitted to bank 309 via network 311.

At step 7, bank 309 may communicate with merchant 301 via network 311. Bank 309 may advise merchant 301 to adhere to the packaging instruction promulgated by bank 309. At step 7, bank 309 may invoice merchant 301 for providing financial services. The invoice may depend, at least in part, on compliance of merchant 301 with the instructions provided by bank 309. For example, if the vault report corresponds to the client report, merchant 301 may be charged a lower rate for the financial services than if the vault report does not correspond to the client report.

Figure 4A:
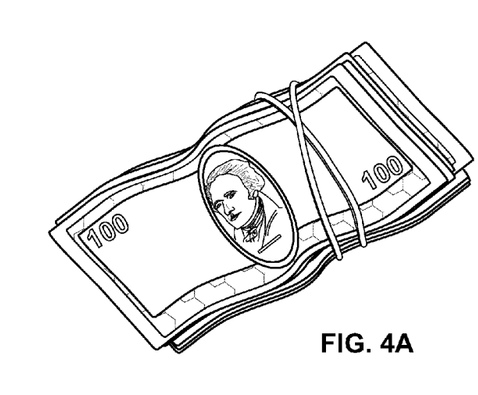
FIGS. 4A-4D show illustrative arrangements in accordance with principles of the invention.

FIG. 4A shows depositable items packaged by a client that includes rubber bands. Packaging depositable items using rubber bands may violate packaging instructions provided by a bank. The rubber bands may delay a processing of the depositable items by a vault. The processing delay may delay a crediting of a value of the depositable items to the client.

Figure 4B:
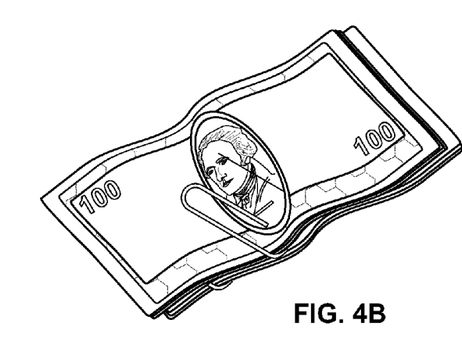

FIG. 4B shows depositable items packaged by a client that includes paper clips. Packaging depositable items using paper clips may violate packaging instructions provided by a bank. The paper clips may delay a processing of the depositable items by a vault. The processing delay may delay a crediting of a value of the depositable items to the client.

Figure 4C:
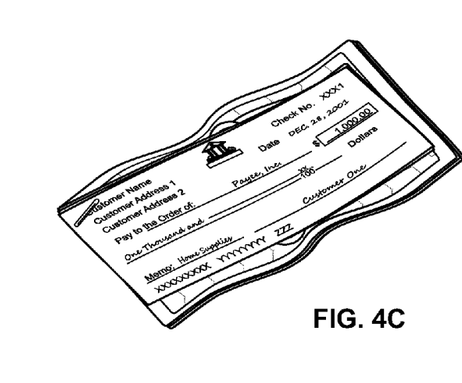

FIG. 4C shows depositable items packaged by a client that includes staples. FIG. 4C shows that depositable items may include checks and cash. A depositable item may be any suitable depositable items such as stocks, bonds and/or other financial instruments. Packaging depositable items using staples may violate packaging instructions provided by a bank. The staples may delay a processing of the depositable items by a vault. The staples may delay processing of the depositable items because the staples inhibit separation of the depositable items included in the deposit. The processing delay may delay a crediting of a value of the depositable items to the client.

Figure 4D:
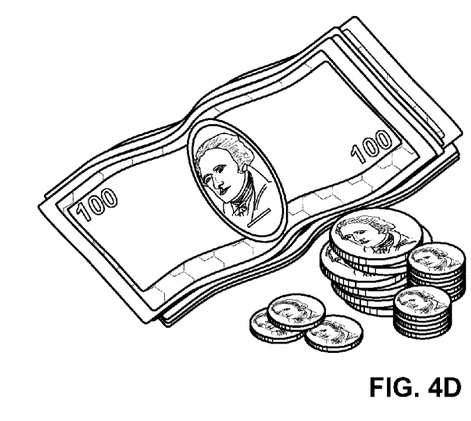

FIG. 4D shows depositable items packaged by a client that includes coins. The amount of coins may exceed a threshold amount of coins allowed by the bank, vault and/or armored courier service. Including coins among other depositable items may increase a difficulty of transporting the depositable items and/or verifying a value of the depositable items.

Figure 5:
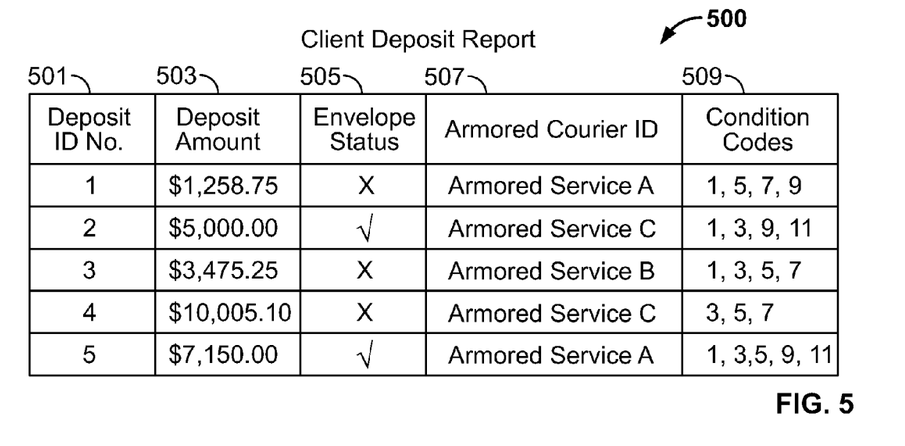
FIG. 5 shows illustrative information in accordance with principles of the invention.

FIG. 5 shows an illustrative client deposit report 500. Client deposit report 500 includes Deposit ID 501, deposit amount 503 and envelope status 505. Client report 500 includes courier 507. Courier 507 corresponds to an armored courier assigned to retrieve a packaged deposit from a client.

Client deposit report includes condition codes 509. Condition codes 509 represent attributes of a deposit packaged by a client. Condition codes 509 are selected by the client and correspond to an affirmation by the client that the deposit ID is associated with the attributes represented by condition codes 509.

Figure 6:
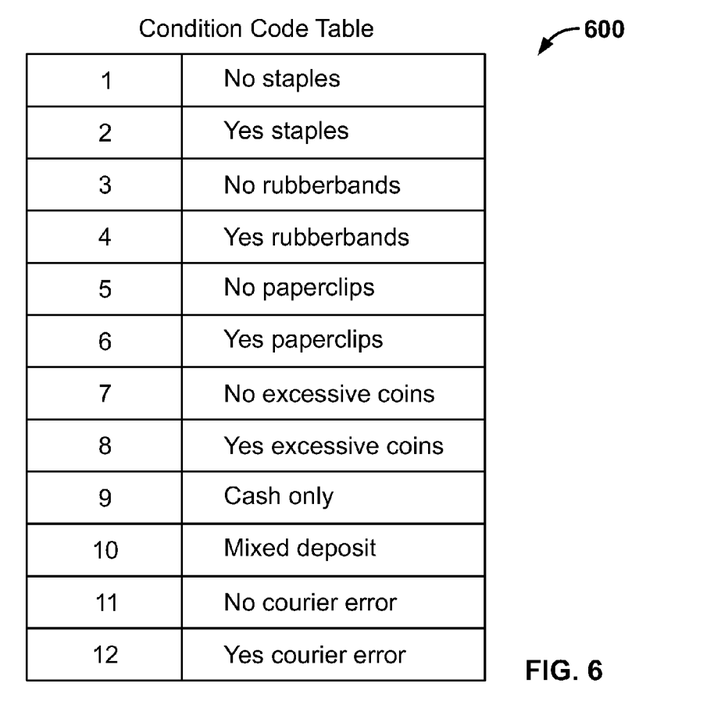
FIG. 6 shows illustrative information in accordance with principles of the invention.

FIG. 6 shows an illustrative condition code table 600. Condition code table 600 shows illustrative condition codes and corresponding deposit attributes. For example, condition code table 600 shows six pairs of condition codes. Codes [1, 2] indicate a presence of staples in the deposit.

Codes [3, 4] indicate a presence of rubber bands in the deposit. Codes [5, 6] indicate a presence of paperclips in the deposit. Codes [7, 8] indicate a presence of excessive coins in the deposit. Codes [9, 10] indicate whether the deposit includes cash only or is a mixed deposit that includes cash and checks.

Codes [11, 12] indicate whether there has been an error in assigning an armored courier to retrieve the deposit from the client. For example, an armored courier may transport deposits to a vault that does not expect to process mixed deposits. Due to an error, the armored courier may retrieve a mixed deposit from a client. In such cases, the vault may impose an extra fee to process the mixed deposit. A presence of a courier error may indicate that the bank is responsible for the extra fee. The presence of a courier error may indicate that the client is not responsible for a fee charged to process a deposit.

Figure 7:
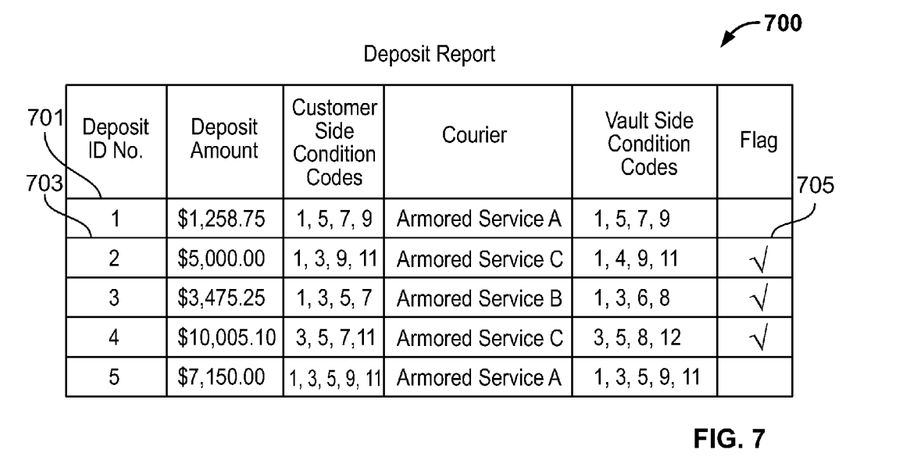
FIG. 7 shows illustrative information in accordance with principles of the invention.

FIG. 7 shows illustrative deposit report 700. Deposit report 700 includes deposits that have been retrieved from a client and processed by a vault. Deposit report 700 includes a plurality of deposit records. For example, deposit report 700 includes deposit record 701 and deposit record 703.

Deposit record 701 is associated with a client side affirmation that the amount of $1,258.75 was not packaged using staples (condition code 1) or paperclips (condition code 5). Deposit record 701 indicates that the client has affirmed that the amount of $1,258.75 does not include an excessive amount of coins (condition code 7) and does not include any checks (condition code 9).

Deposit record 701 indicates that the deposit amount of $1,258.75 was retrieved from the client by armored courier A. Deposit record 701 shows that a vault has confirmed the condition codes submitted by the client associated with the deposit of $1,258.75.

Deposit report 700 includes deposit record 703. Deposit record 703 indicates that the client has affirmed that a deposit of $5,000.00 was not packaged using staples (condition code 1) or rubber bands (condition code 3). Deposit record 703 indicates that the client has affirmed that the deposit amount of $5,000.00 includes cash only (condition code 9) and that the appropriate armored courier has been requested to retrieve the deposit from the client (condition code 11).

Deposit record 703 indicates that a vault has submitted condition codes that are different from the condition codes submitted by the client for the deposit amount of $5,000.00. For example, the vault has indicated that the deposit of $5,000.00 was packaged using rubber bands (condition code 4). As result of a difference between condition codes reported by the client and condition codes reported by the vault, deposit record 703 is associated with flag 705. Deposit record 701 is not associated with a flag. The absence of a flag indicates that condition codes reported by a client have been verified by a vault.

When a deposit record is associated with a flag, the bank may advise the client to be more vigilant in packaging deposits. The bank may request that the vault double check attributes of the deposit. The bank may advise the client that future instances of mis-packaging of deposits or submission of erroneous condition codes may result in higher fees to process the client's deposits. In some embodiments, a processing fee imposed by the vault may be passed on to the client.

Figure 8:
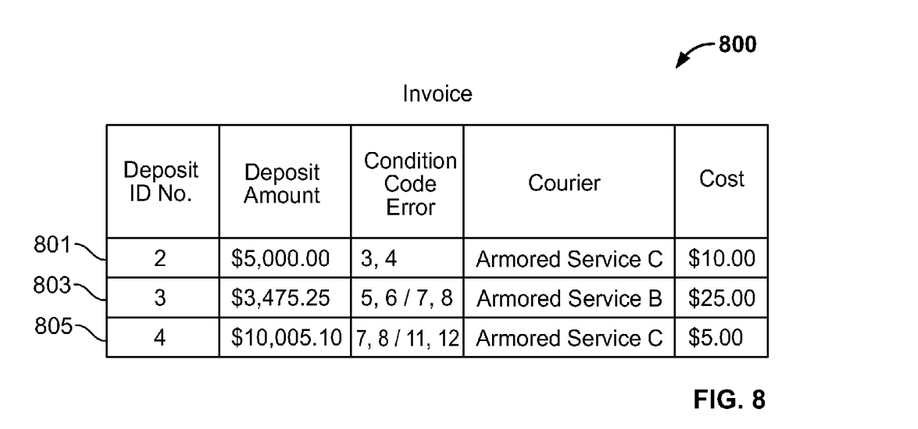
FIG. 8 shows illustrative information in accordance with principles of the invention.

FIG. 8 shows illustrative invoice 800. Invoice 800 may be submitted to a client in response to a detection of a flag associated with a deposit packaged by the customer. For example, deposit record 801 is associated with a $10.00 fee as a as a result of packaging the deposit amount of $5,000.00 using rubber bands. Deposit record 803 is associated with a $25.00 fee as a result of as a result of packaging the deposit amount of $3,475.25 using paperclips (condition code 6) and including an excessive amount of coins with the deposit (condition code 8).

Invoice 800 shows that deposit record 805 is associated with $5.00 fee as a result of including excessive coins (condition code 8) and requesting the wrong armored courier to retrieve the deposit amount of $10,005.10 (condition code 12).

In some embodiments, different entities such as vaults, banks and/or armored couriers may charge different processing fees for correcting condition code errors. In some embodiments, the client may select one or more entities to process deposits based on a fee schedule of the entity.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for client-side deposit packaging compliance have been provided. Persons skilled in the art will appreciate that the present invention can be practiced by other than the described embodiments, which are presented for purposes of illustration rather than of limitation. The present invention is limited only by the claims that follow.

What is claimed is:
1. A system comprising:
 a cash handling device that:
  sorts cash received by a client; and
  packages the cash using a first number of:
   paper clips;
   staples; or
   rubber bands;
 a processor; and
 a non-transitory computer readable media storing computer executable instructions that when executed by the processor configure a computer system to perform a method for generating an invoice for processing of a deposit of the cash packaged by the client, the method comprising:
receiving a client deposit report from the client, the client deposit report comprising a first condition code corresponding to an affirmation by the client that the first number of paper clips, staples or rubber bands used by the cash handling machine to package the cash is less than a threshold number of:
paper clips;
staples; or
rubber bands;
receiving a vault deposit report from a vault that processes the cash included in the deposit, the vault deposit report comprising a second condition code corresponding to an affirmation by the vault that the cash in the deposit packaged by the client includes the threshold number of:
paper clips;
staples; or
rubber bands;
detecting a number of discrepancies between the affirmation made by the client and the affirmation made by the vault;
calculating a processing cost owed by the client for the processing of the cash in the deposit based on:
the number of discrepancies; and
a past history of the client's compliance with deposit packaging instructions;
generating the invoice based on the number of discrepancies;
determining an expected time delay for crediting the deposit to the client, the expected time delay triggered by a presence of the threshold number of paper clips, staples or rubber bands; and
transmitting the invoice and the expected time delay to the cash handling device.

2. The computer system of claim 1, the method further comprising transmitting the processing cost to the client.

3. The computer system of claim 1, the method further comprising receiving the client deposit report from the client as an XML data feed.

4. The computer system of claim 1, the method further comprising receiving the vault deposit report from the vault as an XML data feed.

5. The computer system of claim 1, the method further comprising prompting the client for entry of the first condition code by displaying a plurality of condition codes.

6. The computer system of claim 1, the method further comprising prompting the vault for entry of the second condition code by displaying a plurality of condition codes.

7. The computer system of claim 1 wherein the client deposit report comprises:
an identifier corresponding to the courier assigned to transfer the deposit packaged by the client to the vault;
an envelope status of the deposit packaged by the client; and
a counterfeit status of currency included in the deposit packaged by the client.

8. A system comprising:
a cash handling device that:
sorts cash received by a client; and
packages the cash using:
paper clips;
staples; or
rubber bands;
a processor; and
a non-transitory computer readable media storing computer executable instructions that when executed by the processor configures a computer system to:
receive a first client report comprising a first set of condition codes that affirm the client has removed a first number of paper clips, staples or rubber bands from a first deposit of cash packaged by the cash handling device;
receive a vault report comprising a second set of condition codes comprising an affirmation by the vault that, based on a processing of the first deposit, the first deposit includes a threshold number of:
paper clips;
staples; or
rubber bands;
identify one or more differences between the second set of condition codes and the first set of condition codes;
determine an expected time delay associated with crediting the first deposit to the client when the first deposit includes the threshold number of paper clips, staples or rubber bands; and
when the threshold number of paper clips, staples or rubber bands is associated with an expected time delay for crediting the cash to the client that exceeds a pre-determined tolerance, configuring the cash handling device, via electronic communication, to generate an adaptive template for a second client report based on the one or more differences between the second set of condition codes and the first set of condition codes;
wherein the adaptive template:
in response to entry of an affirmation by the client that the client has removed paper clips, staples or rubber bands from a second deposit, display a notice that the first deposit included paper clips, staples or rubber bands; and
display a processing fee imposed for removing the paper clips, staples or rubber bands included in the first deposit.

9. The system of claim 8 wherein the first client report comprises:
an identifier corresponding to a courier assigned to transport the deposit to the vault;
an envelope status of the deposit; and
a counterfeit status of currency included in the deposit.

10. The system of claim 8 wherein the first set of condition codes comprises members corresponding to a confirmation of a task performed by the client before transmitting the first deposit to the vault.

11. The system of claim 10 wherein the task corresponds to removal of non-currency items from among items included in the deposit.

12. The system of claim 10 wherein the first set of condition codes further comprises confirmation that the deposit does not include more than a threshold number of coins.

13. The system of claim 8 wherein:
the first client report is received in XML format; and
the vault report is received in XML format.

14. The system of claim 8 further comprising computer executable instructions that when executed by the processor configure the computer system to:
calculate a compliance of the first deposit with the first set of condition codes based on the difference between the second set of condition codes and the first set of condition codes; and generate an invoice for vault services based on the compliance.

15. The system of claim 14 further comprising computer executable instructions that when executed by the processor configure the computer system to generate the template for the second client report based on the compliance of the first deposit with the first set of condition codes.

16. The system of claim 14 wherein when the compliance is below a threshold level of compliance, the computer executable instructions further configure the computer system to display:
the invoice for vault services generated based on the compliance; and
tasks for packaging the second deposit to avoid payment of a fee included in the invoice.

17. A system comprising:
a cash handling device that:
sorts cash received by a client; and
packages the cash using:
paper clips;
staples; or
rubber bands;
a processor; and
one or more non-transitory computer-readable media storing computer executable instructions which, when executed by a processor on a computer system, perform a method for managing client compliance with a packaging of a deposit of cash, the method comprising:
receiving a compliance report from the client affirming that the client has removed a threshold number of non-depositable items from a deposit packaged by the cash handling device;
extracting a first set of condition codes from the compliance report;
receiving a vault report from a vault service provider that processed the deposit packaged by the cash handling device;
extracting a second set of condition codes from the vault report;
comparing the first set of condition codes to the second set of condition codes;
when the first set of condition codes is identical to the second set of condition codes, transmitting a first invoice to the client; and
when the first set of condition codes is different from the second set of condition codes, and the difference corresponds to an expected time delay for crediting the cash to the client that exceeds pre-determined tolerance, transmitting a second invoice to the client;
wherein the first invoice is different from the second invoice.

18. The media of claim 17 wherein in the method:
the first set of conditions codes corresponds to an affirmation from the client that the deposit packaged by the cash handling device does not include more than a threshold amount of:
paper clips;
staples; and
rubber bands; and
the second set of condition codes corresponds to a confirmation by the courier of the first set of condition codes.

* * * * *